United States Patent [19]
Holm et al.

[11] Patent Number: 6,122,680
[45] Date of Patent: Sep. 19, 2000

[54] MULTIPLE CHANNEL DATA COMMUNICATION BUFFER WITH SEPARATE SINGLE PORT TRANSMIT AND RECEIVE MEMORIES HAVING A UNIQUE CHANNEL FOR EACH COMMUNICATION PORT AND WITH FIXED ARBITRATION

[75] Inventors: Jeffrey J. Holm, Edina; Bruce J. Dunlop, Bloomington, both of Minn.

[73] Assignee: LSI Logic Corporation, Milpitas, Calif.

[21] Appl. No.: 09/099,550

[22] Filed: Jun. 18, 1998

[51] Int. Cl.[7] ....................................................... G06F 3/00
[52] U.S. Cl. .............................. 710/52; 710/28; 710/244; 711/104; 370/412
[58] Field of Search ................................... 710/40, 56, 21, 710/23, 52, 28, 244; 370/412; 711/104

[56] References Cited

U.S. PATENT DOCUMENTS

| | | | |
|---|---|---|---|
| 4,847,750 | 7/1989 | Daniel ...................................... | 395/842 |
| 5,163,136 | 11/1992 | Richmond ................................ | 395/850 |
| 5,214,760 | 5/1993 | Hammond et al. ...................... | 395/250 |
| 5,261,059 | 11/1993 | Hedberg et al. ......................... | 395/325 |
| 5,414,813 | 5/1995 | Shiobara .............................. | 395/200.75 |
| 5,416,909 | 5/1995 | Long et al. ............................... | 395/275 |
| 5,542,110 | 7/1996 | Minagawa ................................ | 395/845 |
| 5,546,385 | 8/1996 | Caspi et al. .............................. | 370/58.2 |
| 5,619,497 | 4/1997 | Gallagher et al. ....................... | 370/394 |
| 5,717,952 | 2/1998 | Christiansen et al. ................... | 395/842 |
| 5,799,209 | 5/1995 | Chatter ..................................... | 395/876 |
| 5,838,994 | 11/1998 | Valizadeh ................................ | 395/876 |

OTHER PUBLICATIONS

"MU95C5480 Lancam," *Music Semiconductors*, Rev. 0, pp. 1–12. (Jul 22, 1994).

"Information technology—Telecommunications and information exchange between systems—High–level data link control (HDLC) procedures—Elements of procedures, "*ISO/IEC*4335, Fifth edition. (Dec. 15, 1993).

"Information technology—Telecommunications and information exchange between systems—High level data link control (HDCL) procedures—Frame structure, "*ISO/IEC*3309, Fifth edition. (Dec. 15, 1993).

W. Simpson, Editor, Daydreamer, "PPP ub HDLC–like Framing,"pp. 1–25, (last modified Jul. 1994) <ftp://ds.internic.net/rfc>.

*Primary Examiner*—Thomas C. Lee
*Assistant Examiner*—Albert Wang

[57] ABSTRACT

A multiple channel data communication buffer includes a first side having a plurality of communication ports and a second side having data routing port. A single port transmit memory is coupled between the plurality of communication ports and the data routing port. A transmit arbitration circuit is coupled to the single port transmit memory, which arbitrates access by the plurality of communication ports and the data routing port to the single port transmit memory. A single port receive memory is coupled between the plurality of communication ports and the data routing port. A receive arbitration circuit coupled to the single port receive memory, which arbitrates access by the plurality of communication ports and the data routing port to the single port receive memory.

15 Claims, 5 Drawing Sheets

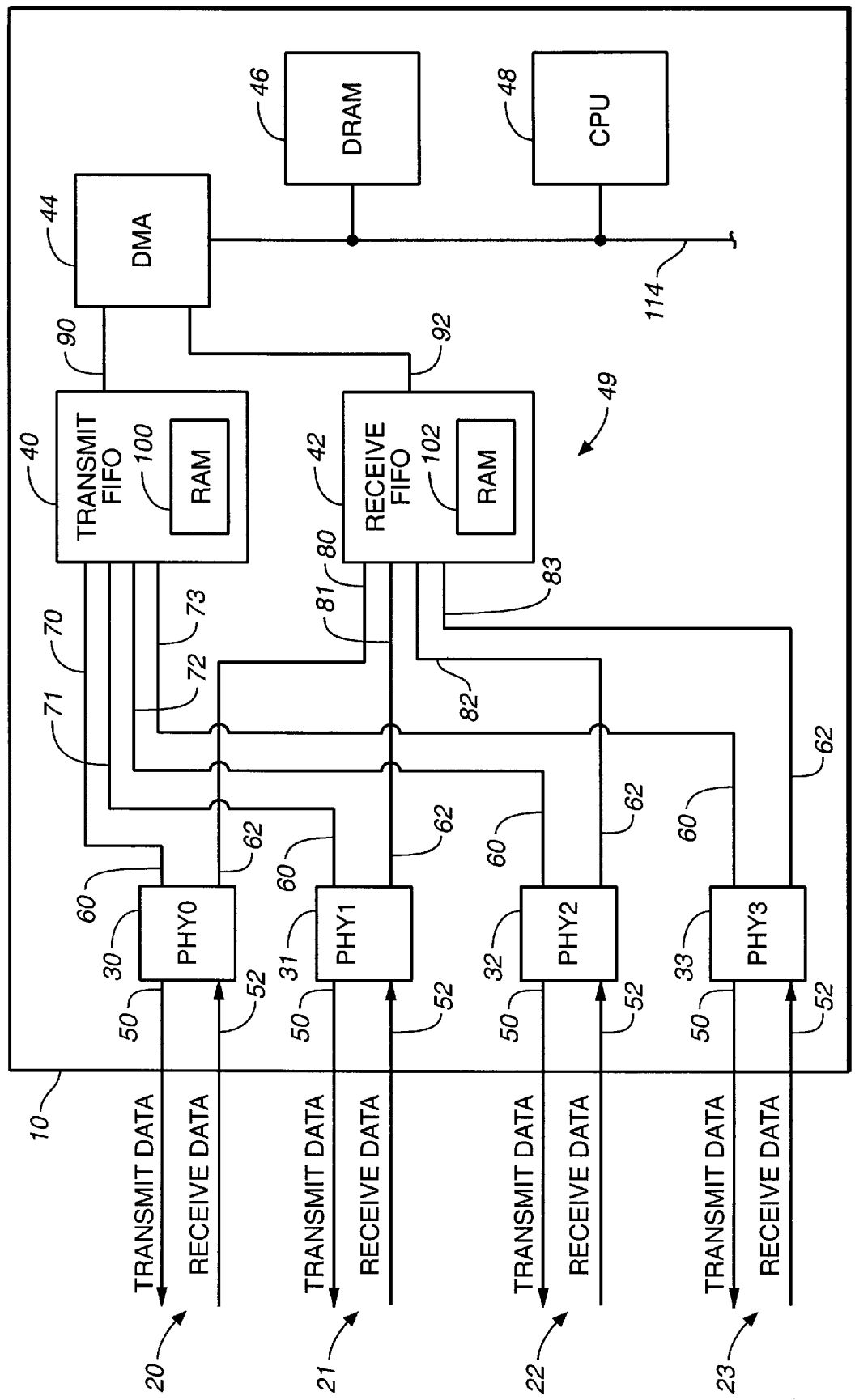
FIG._1

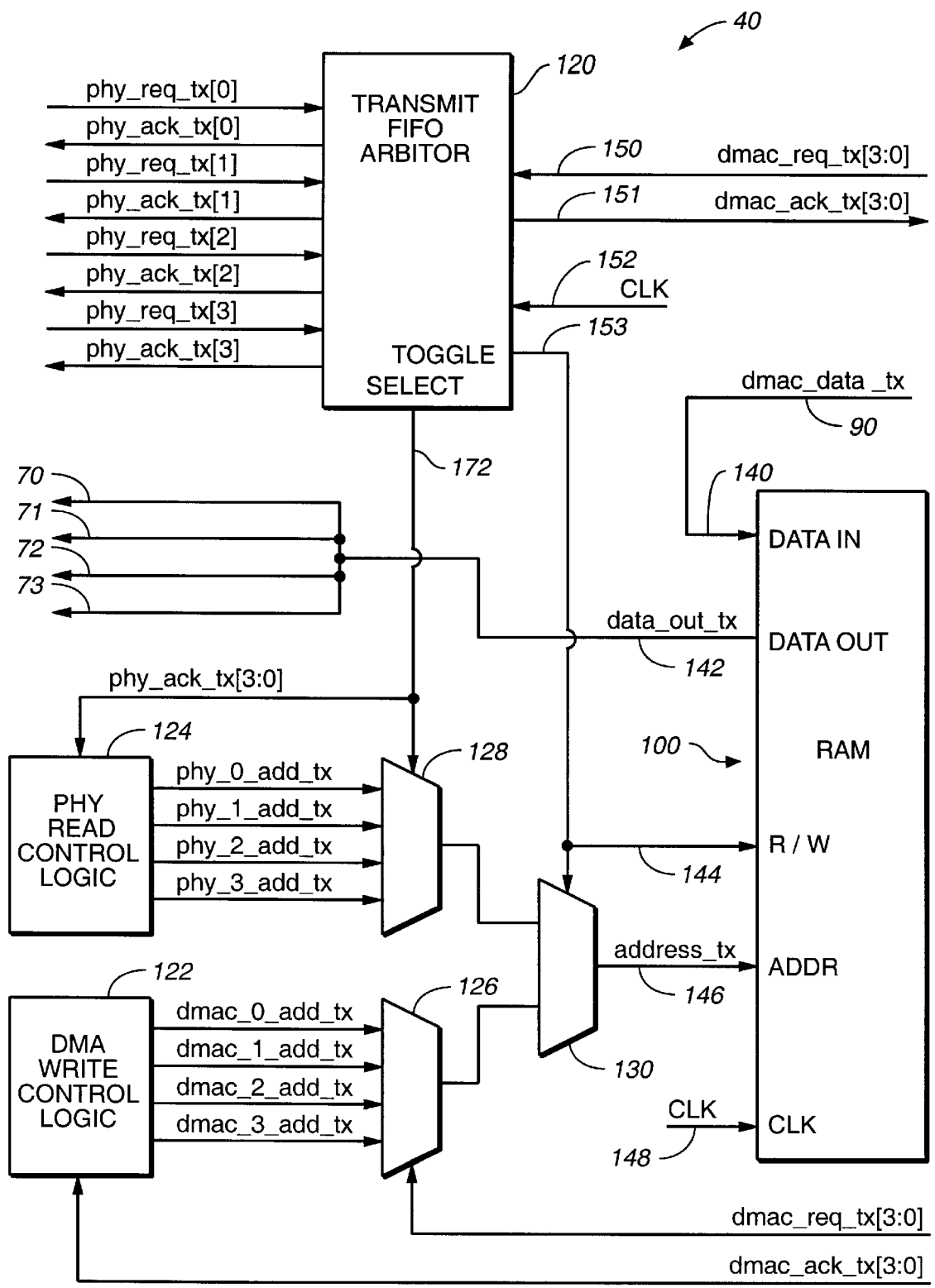
FIG._2

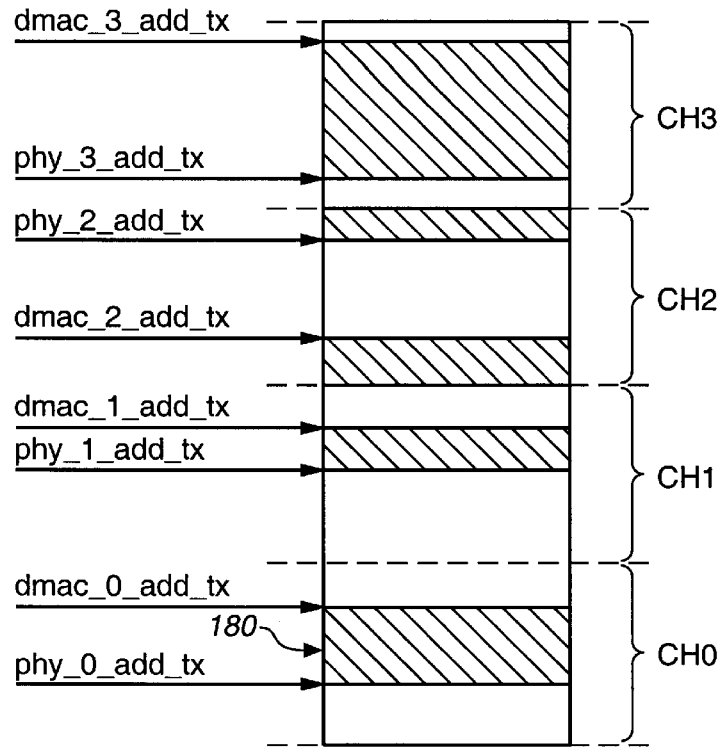
FIG._3
```
         begin                                          190
191      phy_ack_tx = 0;
         if (toggle == 1)
192          begin
193              if (phy_req_tx[0] == 1) phy_ack_tx[0] = 1;
                 else if (phy_req_tx[1] == 1) phy_ack_tx[1] = 1;
                 else if (phy_req_tx[2] == 1) phy_ack_tx[2] = 1;
                 else if (phy_req_tx[3] == 1) phy_ack_tx[3] = 1;
             end
         end
```
FIG._4

```
                                                              194
    begin
195    if (toggle)
196      begin
           case (phy_ack_tx)
           ⎧ 4'b0000: address_tx = phy_0_add_tx;
           ⎪ 4'b0001: address_tx = phy_0_add_tx;
197 ⎨ 4'b0010: address_tx = phy_1_add_tx;
           ⎪ 4'b0100: address_tx = phy_2_add_tx;
           ⎩ 4'b1000: address_tx = phy_3_add_tx;
             default: address_tx = 4'bxxxx;
           endcase
         end
198    else
         begin
           case (dmac_req_tx)
           ⎧ 4'b0000: address_tx = dmac_0_add_tx;
           ⎪ 4'b0001: address_tx = dmac_0_add_tx;
199 ⎨ 4'b0010: address_tx = dmac_1_add_tx;
           ⎪ 4'b0100: address_tx = dmac_2_add_tx;
           ⎩ 4'b1000: address_tx = dmac_3_add_tx;
             default: address_tx = 4'bxxxx;
           endcase
         end
    end
```

FIG._5

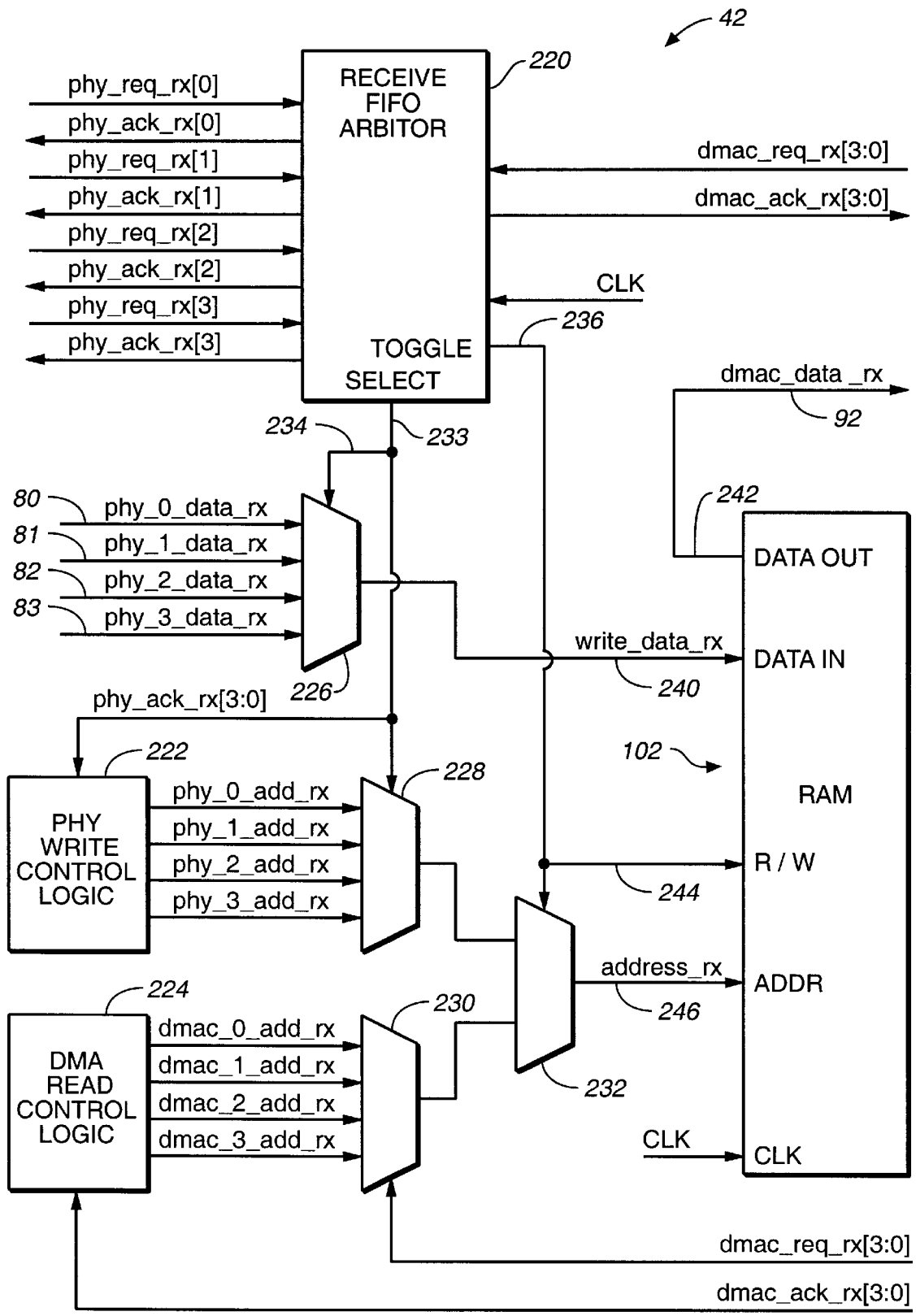
FIG._6

MULTIPLE CHANNEL DATA COMMUNICATION BUFFER WITH SEPARATE SINGLE PORT TRANSMIT AND RECEIVE MEMORIES HAVING A UNIQUE CHANNEL FOR EACH COMMUNICATION PORT AND WITH FIXED ARBITRATION

BACKGROUND OF THE INVENTION

The present invention relates to integrated circuits for data communication systems such as network devices and telecommunications circuits. More particularly, the present invention relates to a multiple channel data buffer for use in an integrated circuit having multiple I/O ports.

Network devices and telecommunication circuits typically have several communication channels for connecting to multiple devices such as computer work stations, telephone and television systems, video teleconferencing systems and other facilities over common data link support carriers.

Personal computers and computer work stations are typically interconnected by local area networks (LANs) such as Ethernet, Token Ring, DECNet and RS-232, whereas remote systems are interconnected by wide area networks (WANs) such as V.34, ISDN Basic Rate Interface (BRI), Frame Relay (T1/E1 or fractional T1/E1), Asynchronous Transfer Mode (ATM) links, ADSL and High Level Data Link Control (HDLC) networks.

In these applications, it is common to use a first-in-first-out (FIFO) buffer for buffering transmit and receive data through each channel. Typically, each communication channel has its own transmit FIFO and receive FIFO. Each FIFO uses a dual port random access memory (RAM) for storing the data. One port is used by the I/O port of the communication channel and the other port is used by a data routing circuit which routes the data between the FIFO and a memory or other device. This structure is not very scalable on an integrated circuit since RAMs have specific layout restrictions on the integrated circuit. For example, RAMs are often required to be placed on an edge of the integrated circuit die. This makes it difficult to place a large number of RAMs on a single integrated circuit and thus limits the number of communication channels that can be supported on the integrated circuit. Improved data communication buffer circuits are desired.

SUMMARY OF THE INVENTION

The multiple channel data communication buffer of the present invention includes a first side having a plurality of communication ports and a second side having data routing port. A single port transmit memory is coupled between the plurality of communication ports and the data routing port. A transmit arbitration circuit is coupled to the single port transmit memory, which arbitrates access by the plurality of communication ports and the data routing port to the single port transmit memory. A single port receive memory is coupled between the plurality of communication ports and the data routing port. A receive arbitration circuit coupled to the single port receive memory, which arbitrates access by the plurality of communication ports and the data routing port to the single port receive memory.

BRIEF DESCRIPTION OF THE DRAWINGS

FIG. 1 is a block diagram of an integrated circuit having a multiple channel data communication buffer according to one embodiment of the present invention.

FIG. 2 is a simplified block diagram of a transmit FIFO within the buffer shown in FIG. 1.

FIG. 3 is a diagram illustrating an example of a memory map of a RAM in the transmit FIFO shown in FIG. 2.

FIG. 4 is a diagram illustrating a simplified hardware description language (HDL) specification for a transmit FIFO arbiter in the transmit FIFO shown in FIG. 2.

FIG. 5 is a diagram illustrating a simplified HDL specification for a series of multiplexers in the transmit FIFO shown in FIG. 2.

FIG. 6 is a simplified block diagram of a receive FIFO within the buffer shown in FIG. 1.

DETAILED DESCRIPTION OF THE PREFERRED EMBODIMENTS

FIG. 1 is a block diagram of an integrated circuit having a multiple channel data communication buffer according to one embodiment of the present invention. Integrated circuit 10 includes input-output (I/O) ports 20, 21, 22 and 23, communication interface units 30, 31, 32 and 33, transmit first-in-first-out (FIFO) circuit 40, receive FIFO circuit 42, direct memory access (DMA) controller 44, memory 46 and central processing unit (CPU) 48. Transmit FIFO circuit 40 and receive FIFO circuit 42 together form a multiple channel communication buffer 49 for buffering transmit and receive data between I/O ports 20–23 and DMA controller 44.

I/O ports 20–23 are coupled to communication interface units 30–33, respectively, wherein each port includes a transmit data output 50 and a receive data input 52. Communication interface units 30–33, labeled "PHY 0"–"PHY 3", include Physical Layer devices for interfacing with common data links or carriers through I/O ports 20–23. Communication interface units 30–33 can be configured to implement a desired protocol such as Ethernet, Frame Relay (T1/E1 or fractional T1/E1), ISDN basic rate interface (BRI), asynchronous transfer mode (ATM), ADSL, High Level Data Link Control (HDLC) and V.34. Other types of communication interface units can also be implemented on integrated circuit 10.

Communication interface units 30–33 have transmit inputs 60 which are coupled to transmit output ports 70–73, respectively, of transmit FIFO 40. Communication interface units 30–33 have receive outputs 62 which are coupled to receive input ports 80–83, respectively, of receive FIFO 42. Transmit FIFO 40 has a data routing input 90 which is coupled to DMA controller 44. Receive FIFO 42 has a data routing output 92 which is coupled to DMA controller 44. DMA controller 44 is coupled to memory 46 and CPU 48 over memory bus 114. In one embodiment, memory 46 includes a dynamic random access memory (DRAM).

Transmit FIFO 40 includes a single port random access memory (RAM) 100 for buffering transmit data from DMA controller 44 to I/O ports 20–23. Receive FIFO 42 includes a single port RAM 102 for buffering receive data from I/O ports 20–23 to DMA controller 44. Each pair of transmit and receive data paths between DMA controller 44 and I/O ports 20–23 constitutes a logical data communication channel. Each channel preferably has its own address ranges or memory blocks within RAMs 100 and 102 in which to buffer data. The first data word or byte stored in a particular memory block through one side of the FIFO is the first word or byte retrieved through the other side of the FIFO.

DMA controller 44 operates as a data routing circuit which routes transmit data from memory 46 to a selected channel in transmit FIFO 40 and routes receive data from a selected channel in receive FIFO 42 to memory 46 where it can be accessed by CPU 48 or another device (not shown) which is coupled to memory bus 114. DMA controller 44 can be replaced with any other data routing circuit, such as CPU 48, another communication interface unit or a feed-through circuit which feeds receive data from receive FIFO 42 to transmit FIFO 40.

Since RAMs 100 and 102 are single port memories, transmit FIFO 40 and receive FIFO 42 arbitrate access to each RAM between communication interface units 30–33 and DMA controller 44. Only a single device is granted access to each RAM at a time. In a preferred embodiment, transmit FIFO 40 and receive FIFO 42 grant DMA controller 44 access to RAMs 100 and 102 on every other memory clock cycle. Communication interface units 30–33 share access to RAMs 100 and 102 during the other memory clock cycles. Transmit FIFO 40 and receive FIFO 42 preferably arbitrate access between communication interface units 30–33 according to a fixed arbitration scheme in which each unit is assigned a unique priority level. If two or more communication interface units request access at the same time, the unit having the highest assigned priority level receives access. The units having lower assigned priority levels must wait until all units having a higher priority level have been serviced.

The following table shows an example of the priority levels for communication interfaces 30–33 (labeled PHY 0–PHY 3).

TABLE 1

| PRIORITY LEVEL | INTERFACE |
|---|---|
| 0 | PHY 0 |
| 1 | PHY 1 |
| 2 | PHY 2 |
| 3 | PHY 3 |

PHY 0 has the highest priority level "0". PHY 1 has the next highest priority level "1". PHY 2 has the next highest priority level "2". Finally, PHY 3 has the lowest priority level "3".

Preferably, the communication interface unit for the communication channel having the highest data rate or bandwidth receives the highest priority level. The communication interface unit for the communication channels having the next highest bandwidth receives the second highest priority level. This pattern repeats to the communication interface unit for the lowest bandwidth communication channel, which receives the lowest priority level. To avoid transmit underruns and receive overflows, the total bandwidth of all communication channels is preferably less than the bandwidth between DMA controller 44 and FIFOs 40 and 42. Given this structure, and if all communication channels transmit and receive data at a constant rate (i.e. the time between accesses does not change), arbitration for the FIFOs will not cause receive overflows or transmit underruns.

During a transmit operation, DMA controller 44 gets a word or byte from memory 46, then requests access to RAM 100 of transmit FIFO 40 for a particular channel. At the next memory clock cycle assigned to DMA controller 44, DMA controller 44 places the transmit word or byte into RAM 100, within the memory block associated with the desired communication channel. When the communication interface unit for the desired communication channel is ready to transmit more data, the unit requests access to RAM 100.

When transmit FIFO 40 grants the communication interface unit access to RAM 100, the unit retrieves the stored transmit word or byte from RAM 100 and transmits the data through its respective I/O port 20–23.

During a receive operation, each communication interface unit 30-33 having receive data requests access to RAM 102 within receive FIFO 42. On the next memory clock cycle assigned to communication interface units a 30–33, receive FIFO 42 grants the unit having the highest priority level access to RAM 102. That unit then transfers its receive data to the associated memory block within RAM 102. When DMA controller 44 is ready to accept more receive data, DMA controller 44 requests access to RAM 102 from receive FIFO 42. On the next memory clock cycle given to DMA controller 44, receive FIFO 42 grants DMA controller 44 access to RAM 102. DMA controller 44 retrieves the receive data from the associated memory block within RAM 102 and stores the receive data in memory 46 SO it to be accessed by CPU 48 or another device or communication port coupled to memory bus 114.

FIG. 2 is a simplified block diagram of transmit FIFO 40. Transmit FIFO 40 includes RAM 100, transmit FIFO arbiter 120, DMA write control logic 122, PHY read control logic 124 and address multiplexers 126, 128 and 130. RAM 100 includes data input 140, data output 142, read/write control input 144, address input 146 and clock input 148. Data input 140 is coupled to data routing port 90, which is coupled to DMA controller 44 for receiving a multiple-bit transmit data word dmac_data_tx. The designation "tx" indicates "transmit data". Data output 142 provides a multiple-bit data word data_out_tx to transmit output ports 70–73 of FIFO 40, which are coupled to respective communication interface units 30–33 (as shown in FIG. 1). Address input 146 is coupled to the output of multiplexer 130 and receives a transmit address pointer address_tx from either DMA write control logic 122 or PHY read control logic 124. Clock input 148 receives a memory clock signal CLK from a clock generator (not shown) within integrated circuit 10 for controlling read and write operations.

DMA write control logic 122 maintains a DMA address pointer for each communication channel. These address pointers are labeled dmac_0_add_tx, dmac_1_add_tx, dmac_2_add_tx and dmac_3_add_tx and are applied to respective inputs of multiplexer 126. the output of multiplexer 126 is coupled to one of the inputs of multiplexer 130. PHY read control logic 124 maintains a PHY address pointer for each of the communication channels, which are labeled phy_0_add_tx, phy_1_add_tx, phy_2_add_tx and phy_3_add_tx. The PHY address pointers are coupled to respective inputs of multiplexer 128. The output of multiplexer 128 is coupled to the other input of multiplexer 130.

The select control inputs of multiplexer 126 are coupled to DMA request bus dmac_req_tx[3:0], which includes one bit for each communication channel. Each time DMA controller 44 requests access to a particular channel within RAM 100, it sets the corresponding bit in dmac_req_tx [3:0] to a logical "1". The binary pattern formed by dmac_req_tx[3:0] selects the DMA address pointer for the corresponding channel so it is applied to the output of multiplexer 126.

Transmit FIFO arbiter 120 has a DMA request input 150 which is coupled to DMA request bus dmac_req_tx[3:0] and has a DMA acknowledge output 151 which is coupled to DMA acknowledge bus dmac_ack_tx[3:0]. DMA acknowledge bus dmac_ack_tx[3:0] is coupled to DMA controller 44 (shown in FIG. 1). On the next memory cycle assigned to DMA controller 44, after DMA controller 44 sets one of the bits within DMA request bus dmac_req_tx[3:0] to a logical "1", transmit FIFO arbiter 120 sets the corresponding bit in DMA acknowledge bus dmac_ack_tx[3:0] to acknowledge that DMA controller 44 has access to RAM 100 through data input 140.

Transmit FIFO arbiter 120 monitors the memory clock cycles through clock input 152 and toggles a logic state on TOGGLE output 153 after each memory cycle. TOGGLE output 153 is coupled to read-write input 144 of RAM 100 and to the select control input of multiplexer 130. When TOGGLE output 153 is a logical "0", RAM 100 is placed in a write mode and multiplexer 130 applies the selected DMA address pointer to address input 146 of RAM 100. When TOGGLE output 153 is a logical "1", RAM 100 is placed in a read mode and multiplexer 130 applies a selected PHY address pointer from multiplexer 128 to address input 146 of RAM 100. This alternates RAM 100 between a write cycle and a read cycle on each cycle of memory clock CLK.

Transmit FIFO arbiter 120 has a plurality of PHY request inputs phy_req_tx[3:0], wherein each bit of phy_req_tx[3:0] is coupled to a respective one of the communication interface units 30–33. Transmit FIFO arbiter 120 has a plurality of PHY acknowledge outputs phy_ack_tx[3:0], wherein each bit of phy_ack_tx[3:0] is coupled to a respective one of the communication interface units 30–33. When a particular communication interface unit is ready to transmit another data word, it sets its corresponding bit in phy_req_tx[3:0] to a logic "1". On the next memory clock cycle assigned to communication interface units 30–33, transmit FIFO arbiter 120 determines which bits of phy_req_tx[3:0] are set. Transmit FIFO arbiter 120 then sets the corresponding acknowledge bit in phy_ack_tx[3:0] for the communication interface unit having the highest priority level. This notifies the communication interface unit that the requested transmit data word will appear on data output 142 after the next memory clock cycle that is assigned to communication interface units 30-33.

The PHY acknowledge bits phy_ack_tx[3:0] are also applied to SELECT output 172 of transmit FIFO arbiter 120 for controlling multiplexer 128 and PHY read control logic 124. When one of the bits in phy_ack_tx[3:0] is set, PHY read control logic 124 increments the corresponding PHY address pointer and multiplexer 128 applies that pointer to multiplexer 130. On the next cycle of memory clock CLK that is assigned to communication interface units 30–33, TOGGLE output 153 goes high causing multiplexer 130 to select the PHY address pointer from multiplexer 128 and apply that address pointer to address input 146 of RAM 100. TOGGLE output 153 also places RAM 100 in a read cycle through read-write input 144, causing the transmit data addressed by address input 146 to be presented on data output 142 as data_out_tx. The communication interface unit receiving the acknowledge from transmit FIFO arbiter 120 then reads the transmit data from the corresponding transmit output port 70–73.

FIG. 3 is a diagram illustrating an example of a memory map of RAM 100. Each communication channel has its own set of address locations, or memory blocks, labeled CH0–CH3. Each DMA address pointer and PHY address pointer points to one of the address locations within the corresponding memory block CH0–CH3. As DMA controller 44 continues to write transmit data into the memory block for a particular channel, the DMA address pointer increments through the addresses in that block until it reaches the highest address and then wraps back to the lowest address in that block. Similarly, as each communication interface unit reads the transmit data written by DMA controller 44, the corresponding PHY address pointer increments. As long as the DMA address pointer stays ahead of the PHY address pointer for each channel, no transmit data will be lost. For example, valid data 180 is stored in the address locations within block CH0 between PHY address pointer phy_0_add_tx and DMA address pointer dmac_0_add_tx.

FIG. 4 is a diagram illustrating a simplified hardware description language (HDL) specification 190 for a portion of the logical function of transmit FIFO arbiter 120 shown in FIG. 2. During the development of integrated circuit 10, the HDL specification shown in FIG. 4 is passed to a series of computer-aided design tools which synthesize the HDL specification into a logical circuit which can be fabricated. The logical function defined in HDL specification 190 is sensitive to changes in phy_req_tx[3:0]. At 191, transmit FIFO arbiter 120 resets each bit of phy_ack_tx[3:0] to "0". At 192, if TOGGLE output 153 equals "1", indicating that one of the communication interface units needs to be serviced, then transmit FIFO arbiter 120 polls each bit of phy_req_tx[3:0] from highest priority to lowest priority. The first PHY request bit that is set to "1" in the order of priority gets serviced first. Transmit FIFO arbiter 120 sets the corresponding PHY acknowledge bit to "1", indicating that that communication channel has access to RAM 100. For example, if the highest priority PHY request bit that is set to "1" is phy_req_tx[1], then transmit FIFO arbiter 120 sets phy_ack_tx[1] to "1", as shown at 193.

FIG. 5 is a diagram illustrating a simplified HDL specification 194 for the logical function of multiplexers 126, 128 and 130. At 195, if TOGGLE output 153 equals 1, the logical function proceeds to step 196 to select one of the PHY address pointers to address RAM 100. The logical function of multiplexers 126, 128 and 130 uses the PHY acknowledge bits phy_ack_tx[3:0] as selection variables. The five possible binary patterns formed by phy_ack_tx[3:0] are listed at 197, where "4'b" indicates a four-bit binary value. If transmit FIFO arbiter 120 sets PHY acknowledge bit phy_ack_tx[1] to "1", then phy_ack_tx[3:0] will have a pattern "4'b0010" and address_tx is set to equal the PHY address pointer phy_1_add_tx for channel "1".

If TOGGLE output 153 equals 0, the logical function proceeds to step 198 to select one of the DMAC address pointers to address RAM 100. The four DMAC request bits dmac_req_tx[3:0] are used as selection variables and form one of five binary patterns listed at 199. The binary pattern formed by dmac_req_tx[3:0] determines which DMAC address pointer is provided to address input 146 as address_tx.

FIG. 6 is a simplified block diagram of receive FIFO 42 shown in FIG. 1. Receive FIFO 42 is similar to transmit FIFO 40 but buffers data in the reverse direction, from communication interface units 30–33 to DMA controller 44. Receive FIFO 42 includes RAM 102, receive FIFO arbiter 220, PHY write control logic 222, DMA read control logic 224, data multiplexer 226 and address 228, 230 and 232. Receive FIFO arbiter 220 has a plurality of PHY request inputs phy_req_rx[3:0], wherein each bit of phy_req_rx[3:0] is coupled to a respective one of the communication interface units 30–33. the designation "rx" indicates "receive". Receive FIFO arbiter 220 also has a plurality of PHY acknowledge outputs phy_ack_rx[3:0], wherein each bit of phy_ack_rx[3:0] is coupled to a respective one of the communication interface units 30–33.

When one or more of the communication interface units 30–33 have receive data to be stored in RAM 102, those units set the corresponding bits in phy_req_rx[3:0] to a logical "1". Receive FIFO arbiter 220 maintains a priority level for each of the communication interface units 30–33 similar to that shown in Table 1. Receive FIFO arbiter 220 grants access to the communication interface unit having the highest priority of the units having their PHY request bit set. When receive FIFO arbiter 220 grants one of the communication interface units 30–33 access to RAM 102 it sets the corresponding bit in phy_ack_rx[3:0] to a logical "1". The binary pattern formed by phy_ack_rx[3:0] is applied to SELECT output 233 for use as a selection variable for multiplexers 226 and 228 and a control signal for PHY write control circuit 222.

Multiplexer 226 has a plurality of multiple-bit data inputs phy_0_data_rx, phy_1_data_rx, phy_2_data_rx and phy_3data_rx which are coupled to receive FIFO input ports 80–83, respectively, for receiving the receive data from the corresponding communication interface units 30–33. Multiplexer 226 has a select input 234 which is coupled to SELECT output 233 of receive FIFO arbiter 220. Multiplexer 226 detects which PHY acknowledge bit is set and selects the corresponding PHY data input to be applied to data input 240 of RAM 102 as write_data_rx.

PHY write control logic 222 maintains a PHY address pointer for each of the communication interface units 30–33. These pointers are labeled phy_0_add_rx, phy_1_add_rx, phy_2_add_rx and phy_3_add_rx. PHY write control logic 222 increments the PHY address pointers to point to the next subsequent address location in RAM 102 each time the corresponding phy_ack_rx[3:0] bits are set by receive FIFO arbiter 220. The PHY address pointers are coupled to the inputs of multiplexer 228. The output of multiplexer 228 is coupled to one of the inputs multiplexer 232. Multiplexer 228 determines which PHY acknowledge bit is set and selects the corresponding PHY address pointer to be applied to the input of multiplexer 232.

As in transmit FIFO 40, receive FIFO 42 grants access to one of the communication interface units 30–33 on every other clock cycle of memory clock CLK. Receive FIFO 42 grants DMA controller 44 access to RAM 102 on the remaining clock cycles of memory clock CLK. TOGGLE output 236 is coupled to read-write control input 244 of RAM 102 and the select input of multiplexer 232 and changes state after each cycle of memory clock CLK. When TOGGLE output 236 is a "1", RAM 102 is placed in write mode and multiplexer 232 selects the PHY address pointer provided by multiplexer 228 to be applied to address input 246 of RAM 102 as address_rx.

Similarly, DMA read control logic 224 maintains a DMA address pointer for each of the communication channels. These address pointers are labeled dmac_0_add_rx, dmac_1_add_rx, dmac_2_add_rx, and dmac_3_add_rx and are coupled to the inputs of multiplexer 230. The output of multiplexer 230 is coupled to the other input of multiplexer 232. On every other clock cycle of memory clock CLK, when toggle output TOGGLE is a logic "0", multiplexer 232 selects the DMA address pointer provided by multiplexer 230 to address input 246 of RAM 102 as address_rx.

When DMA controller 44 is ready to receive a data word from one of the communication channels, it sets the corresponding bit in DMA request bus dmac_req_rx[3:0] to a logic "1". On every other cycle of memory clock CLK, receive FIFO arbiter 220 grants DMA controller 44 access to RAM 102 to read the requested data word from the corresponding address block in RAM 102 and places RAM 102 in read mode through read-write control input 244. Receive FIFO arbiter 220 sets the corresponding bit in DMA acknowledge bus dmac_ack_rx[3:0] to a logic "1". Each time receive FIFO arbiter 220 sets one of the bits in DMA acknowledge bus dmac_ack_rx[3:0], DMA read control logic 224 increments the corresponding DMA address pointer to point to the next subsequent address of the memory block in RAM 102. Multiplexer 230 selects the DMA address pointer for the requested channel as a function of which bit is set in DMA request bus dmac_req_rx[3:0]. The selected DMA address pointer is provided to address input 246 of RAM 102 through multiplexer 232. DMA controller 44 then reads the requested data word from data output 242.

The multiple channel data communication buffer of the present invention has single port RAMs and a fixed arbitration among a plurality of communication channels. Combining all of the transmit channels into one memory and all of the receive channels into one memory saves area and edge space on the integrated circuit. The combined transmit and receive FIFOs are very scalable so that a large number of communication channels can be implemented on a single integrated circuit. Also, the size of each memory is reduced by using a single port RAM which is shared between both sides of the FIFO. This has a direct impact on the die size, yield and final cost of the integrated circuit.

Arbitration complexity is significantly reduced by using fixed priority levels between the various communication channels as opposed to using a traditional round robin arbitration scheme. As long as data is transmitted and received at a constant rate through each communication channel and the total bandwidth of the communication channels is less than half of that of RAMs 100 and 102, respectively, the width of the data buses on either side of the FIFOs can be any size and the clock rate can be any speed. If the data rates are not completely constant, a small FIFO can be added between the communication interface unit and the main transmit and receive FIFOs as a buffer to allow for discrepancies in the data rate.

The simplified, fixed arbitration scheme simplifies verification of the design in term of logic functionality and timing. Design verification is typically a bottleneck in the "time to market" for integrated circuits such as application specific integrated circuits (ASICs). By simplifying arbitration, the verification time is reduced.

The multiple channel data communication buffer of the present invention is particularly beneficial for use in telecommunication and network device applications. Although the present invention has been described with reference to preferred embodiments, workers skilled in the art will recognize that changes may be made in form and detail without departing from the spirit and scope of the invention.

What is claimed is:

1. A multiple channel data communication buffer comprising:
   a first side having a plurality of communication ports;
   a second side having data routing port;
   a single port transmit memory coupled between the plurality of communication ports and the data routing port and having a unique transmit channel for each of the plurality of communication ports;
   a transmit arbitration circuit coupled to the single port transmit memory, which arbitrates access by the plurality of communication ports and the data routing port to the single port transmit memory, wherein only one of the plurality of communication ports or the data routing port have access to the single port transmit memory at one time;
   a single port receive memory coupled between the plurality of communication ports and the data routing port and having a unique receive channel for each of the plurality of communication ports; and a receive arbitration circuit coupled to the single port receive memory, which arbitrates access by the plurality of communication ports and the data routing port to the single port receive memory, wherein only one of the plurality of communication ports or the data routing Port have access to the single port receive memory at one time.

2. The multiple channel data communication buffer claim 1 and further comprising:

a plurality of communication interface units which are coupled to respective ones of the plurality of communication ports;

a direct memory access (DMA) controller which is coupled to the data routing port;

a buffer memory which is coupled to the DMA controller; and a central processing unit which is coupled to the buffer memory and to the DMA controller.

3. The multiple channel data communication buffer of claim 2 wherein the plurality of communication ports, the data routing port, the single port transmit memory, the transmit arbitration circuit, the single port receive memory, the receive arbitration circuit, the plurality of communication interface units, the DMA controller, the buffer memory and the central processing unit are disposed on a single integrated circuit.

4. The multiple channel data communication buffer of claim 1 wherein:

the transmit arbitration circuit comprises a clock input for receiving a clock signal and means for providing the data routing port with access to the single port transmit memory every other cycle of the clock signal.

5. The multiple channel data communication buffer of claim 1 wherein:

each of the plurality of communication ports comprises a transmit request input which, when asserted, indicates that the communication port requests access to the single port transmit memory; and the transmit arbitration circuit is configured to associate a fixed, unique priority level to each of the plurality of communication ports and comprises means for polling the transmit request input of each of the plurality of communication ports and providing the communication ports that have the transmit request input asserted access to the single port transmit memory in order according to the associated fixed, unique priority levels.

6. The multiple channel data communication buffer of claim 5 wherein each of the plurality of communication ports has an associated maximum data transmission rate and wherein the fixed, unique priority level of each communication port is greater than the fixed, unique priority level of the any of the other communication ports that have a lower associated maximum data transmission rate.

7. The multiple channel data communication buffer of claim 1 wherein the transmit memory comprises a data input coupled to the data routing port, a data output coupled to each of the plurality of communication ports and address input and wherein the transmit arbitration circuit comprises:

a plurality of communication port address pointers associated with the plurality of communication ports, wherein each communication address pointer addresses one of the unique transmit channels within the transmit memory;

a plurality of routing port address pointers associated with the data routing port, wherein each of the routing port address pointers addresses one of the unique transmit channels within the transmit memory; and an address multiplexer having a first set of inputs which are coupled to respective ones of the communication port address pointers, a second set of inputs coupled to respective ones of the routing port address pointers, a multiplexer output which is coupled to the address input of the transmit memory and a multiplexer select input; and a multiplexer control circuit which is coupled to the multiplexer select input.

8. The multiple channel data communication buffer of claim 1 wherein:

the receive arbitration circuit comprises a clock input for receiving a clock signal and means for providing the data routing port with access to the single port receive memory every other cycle of the clock signal.

9. The multiple channel data communication buffer of claim 1 wherein:

each of the plurality of communication ports comprises a receive request input which, when asserted, indicates that the communication port requests access to the single port receive memory; and the receive arbitration circuit is configured to associate a fixed, unique priority level to each of the plurality of communication ports and comprises means for polling the receive request input of each of the plurality of communication ports and providing the communication ports that have the receive request input asserted access to the single port receive memory an order according to the associated fixed, unique priority levels.

10. The multiple channel data communication buffer of claim 9 wherein each of the plurality of communication ports has an associated maximum data transmission rate and wherein the fixed, unique priority level of each communication port is greater than the fixed, unique priority level of the any of the other communication ports that have a lower associated maximum data transmission rate.

11. The multiple channel data communication buffer of claim 1 wherein the receive memory comprises a data input, a data output coupled to the data routing port and address input and wherein the receive arbitration circuit comprises:

a data multiplexer having a plurality of data inputs which are coupled to respective ones of the communication ports, an output coupled to the data input of the receive memory and a multiplexer select input;

a plurality of communication port address pointers associated with the plurality of communication ports, wherein each communication address pointer addresses one of the unique receive channels within the receive memory;

a plurality of routing port address pointers associated with the data routing port, wherein each of the routing port address pointers addresses one of the unique receive channels within the receive memory;

an address multiplexer having a first set of inputs which are coupled to respective ones of the communication port address pointers, a second set of inputs coupled to respective ones of the routing port address pointers, a multiplexer output which is coupled to the address input of the receive memory and a multiplexer select input; and a multiplexer control circuit which is coupled to the multiplexer select inputs of the data multiplexer and the address multiplexer.

12. A method of buffering data between a data routing port and a plurality of communication ports, the method comprising:

receiving receive data on at least one of the plurality of communication ports;

storing the receive data in a single port receive memory having a unique receive channel for each of the plurality of communication ports;

retrieving the receive data from the unique receive channel of the single port receive memory through the data routing port;

arbitrating access to the single port receive memory among the plurality of communication ports and the data routing port;

receiving transmit data on the data routing port;

storing the transmit data in a single port transmit memory having a unique transmit channel for each of the plurality of communication ports;

retrieving the transmit data from the unique transmit channel of the single port transmit memory through at least one of the plurality of communication ports; and arbitrating access to the single port transmit memory among the plurality of communication ports and the data routing port.

13. The method of claim 12 wherein:

receiving receive data comprises requesting access to the single port receive memory for at least one of the plurality of communication ports;

arbitrating access to the single port receive memory comprises associating a fixed, unique priority level to each of the plurality of communication ports and providing access for one of the communication ports that is requesting access and has a highest of the fixed, unique priority levels with respect to the other communication ports that are requesting access to the single port receive memory;

retrieving transmit data comprises requesting access to the single port transmit memory for at least one of the plurality of communication ports; and arbitrating access to the single port transmit memory comprises associating the fixed, unique priority levels to the plurality of communication ports and providing access for one of the communication port that is requesting access and has a highest of the fixed priority levels with respect to the other communication ports that are requesting access to the single port transmit memory.

14. The method of claim 12 wherein:

the single port transmit and receive memories have even and odd clock cycles;

arbitrating access to the single port receive memory comprises providing the data routing port access to the single port receive memory on every odd clock cycle of the single port receive memory and providing one of the plurality of communication ports access to the single port receive memory on every even clock cycle of the single port receive memory; and arbitrating access to the single port transmit memory comprises providing the data routing port access to the single port transmit memory on every odd clock cycle of the single port transmit memory and providing one of the plurality of communication ports access to the single port transmit memory on every even clock cycle of the single port transmit memory.

15. An integrated circuit comprising:

a plurality of communication ports;

a plurality of communication interface units which are coupled respective ones of the plurality of communication ports;

a data routing port;

a data routing circuit coupled to the data routing port;

a single port transmit memory coupled between the plurality of communication interface units and the data routing port and having a unique transmit channel for each of the plurality of communication ports;

a transmit arbitration circuit coupled to the single port transmit memory, which arbitrates access by the plurality of communication interface units and the data routing port to the single port transmit memory, wherein only one of the plurality of communication interface units or the data routing port have access to the single port transmit memory at one time;

a single port receive memory coupled between the plurality of communication interface units and the data routing port and having a unique receive channel for each of the plurality of communication ports; and a receive arbitration circuit coupled to the single port receive memory, which arbitrates access by the plurality of communication interfaces and the data routing circuit to the single port receive memory, wherein only one of the plurality of communication interface units or the data routing port have access to the single port receive memory at one time.

* * * * *